June 12, 1951 W. H. HUBSCH 2,556,724
PORTABLE FOLDING DESK FOR AUTOMOBILE SEATS
Filed Jan. 3, 1949
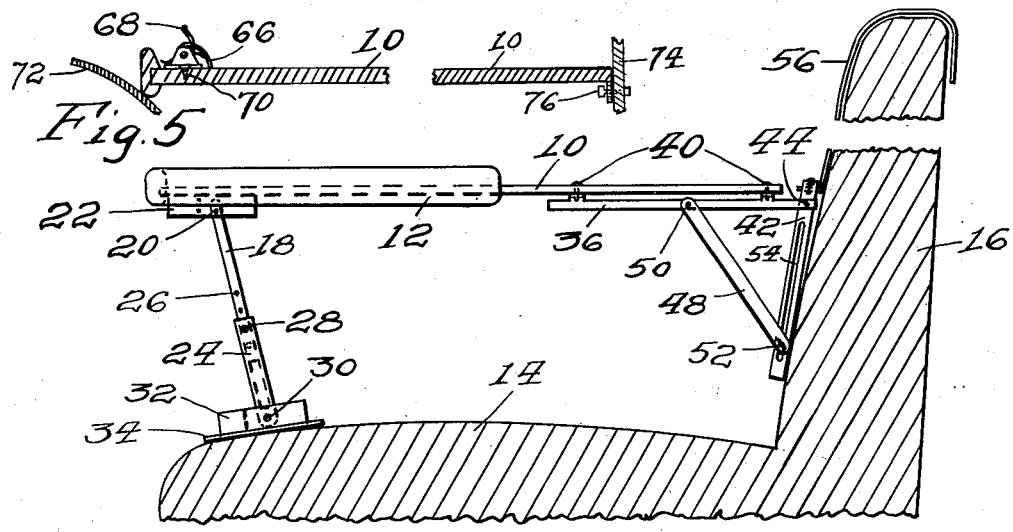
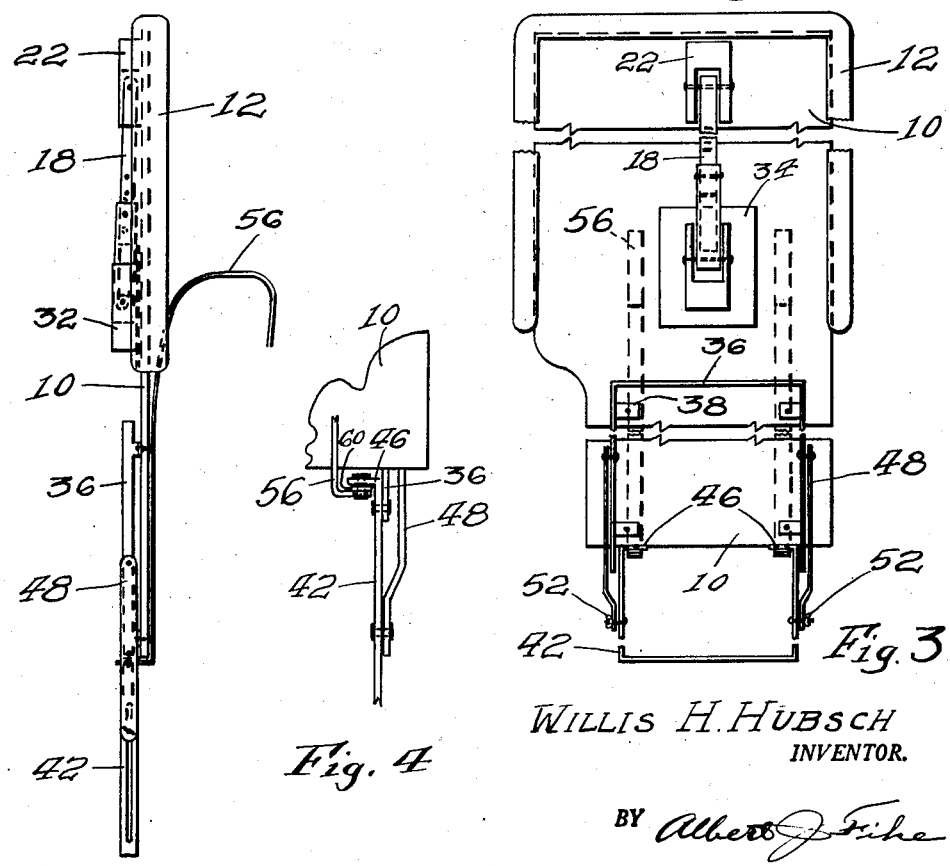
WILLIS H. HUBSCH
INVENTOR.
BY *Albert J. Fihe*
ATTORNEY Patented June 12, 1951

2,556,724

UNITED STATES PATENT OFFICE 2,556,724

PORTABLE FOLDING DESK FOR AUTOMOBILE SEATS

Willis H. Hubsch, Burbank, Calif.

Application January 3, 1949, Serial No. 68,920

2 Claims. (Cl. 311—21)

This invention relates to an improved portable folding desk for automobile seats and has for one of its principal objects the provision of a portable desk which can be used in automobiles and particularly upon the front seat thereof next to the driver or operator of the car so that considerable paper work can be accomplished without the necessity of leaving the car.

One of the important objects of this invention is to provide a portable folding desk for use in automobiles which will be particularly adaptable and attractive to salesmen and others who are compelled, by the nature of their business, to move about almost continuously in an automobile and who, at the same time, are confronted with the necessity of keeping records while en route.

Still another important object of the invention is to provide a portable desk which can be conveniently used in automobiles at a moment's notice and which when not in use can be folded into a compact package which can then easily be stowed away in a small space whereby it will not interfere with the use of all other available space in the automobile at any time.

Still another object of the invention is to provide a desk or table which can be used in automobiles and which will be quite suitable for purposes other than writing, such as the serving of light meals, demonstration of small objects, reading of maps, and divers other purposes.

Other and further important objects of the invention will be apparent from the disclosures in the accompanying drawings and following specification.

The invention, in a preferred form, is illustrated in the drawings and hereinafter more fully described.

In the drawings:

Figure 1 is a side elevation, particularly in section, of the improved car desk of this invention, showing the same in operating position.

Figure 2 is a side view of the desk showing the same in folded relationship.

Figure 3 is a bottom plan view of the car desk when folded, parts being broken away.

Figure 4 is a detail view of a portion of the construction illustrating a modified form whereby the supporting hooks can be still further folded.

Figure 5 is a detail view of an appurtenance for the desk whereby loose papers may be held in position.

As shown in the drawings:

The reference numeral 10 indicates generally the writing surface of the improved car desk of this invention which is of sufficient dimensions to adequately support the usual amount of books, papers and the like which are ordinarily used by traveling salesmen such as insurance agents, solicitors and the like.

A range 12 surrounds the forward portion of the table or desk 10 whereby papers and the like are more adequately maintained in desired position on the desk surface.

As will be evident from Figure 1, the working surface 10 extends over an area outlined in one dimension by approximately the front edge of the automobile seat 14 and the face or forward surface of the seat-back 16. The width of the desk surface 10 may be in proportion.

The forward end of the working surface 10 is supported at a desired level by means of an adjustable collapsible upright 18, which is pivoted at 20 to a support 22 fastened to the underface of the table or desk 10. The extension or support 18 is telescopic and fits into a tubular lower portion 24, as illustrated. Openings 26 are provided in the rod 18 and other openings 28 are in the tube 24 so that the effective height of the support 18—24 can be adjusted by means of a pin, bolt or the like passing through aligned holes.

The lower end of the tubing 24 is pivotally mounted at 30 in a block 32 which in turn is mounted on a plate 34 which is positioned on the seat cushion 14.

Fastened to the under-surface of the rear end of the working surface 10 is a U-shaped bracket 36 which is preferably of light metal and is supported in position on the under-surface of the desk portion 10 by any suitable means such as angle plates 38 and corresponding rivets or bolts 40.

The ends of this U-shaped element 38 project slightly beyond the rear end of the table 10 and pivotally mounted on these projecting ends is another U-shaped element 42 which is provided with inturned end portions adjacent the pivotal connections.

The pivotal connections are indicated at 44 and the inturned end portions of the U-shaped element 42 are best shown at 46 in Figure 3. Supporting bracket elements 48 are pivoted at 50 to opposed sides of the U-shaped support 36, and the other ends of these bracket elements 48 are provided with winged nuts and bolts 52 which are adapted to operate in slots 54 in the opposed faces of the U-shaped bar 42. Obviously the relationship between the ends of the arms 48 and the U-shaped bar portions 42 can be adjusted by manipulating the respective portions and in fastening the same in desired relationship by means of winged nuts and bolts 52.

Pivotally mounted by means of rivets or the like to the inturned ends 46 of the U-shaped element 42 are two hook-like structures 56 which are adapted to fit over the upper end of the back 16 of the automobile seat portion.

In addition to providing an adjustable relationship between the bars 48 and the supports 36 and 42, the same can be folded into the relationship shown in Figures 2 and 3 when the device is not in use and the support 10—34 can also be folded about its pivot point 20. This provides a telescoping or collapsing structure which will take up very little room when not in use as will be evident from the showing in Figure 2.

Furthermore, the hooks 56 can be additionally folded if so desired, this being accomplished by way of a modified structure illustrated in Figure 4. As shown in this figure, the bracket 48, the U-shaped element 42 and the table supporting strip 36, remain the same even to the inturned portions 46 of the element 42.

However, instead of connecting the lower end of the hook element 56 directly to the inturned portion 46 of the U-shaped element 42, an auxiliary strip is provided as illustrated at 60. This is fastened by a rivet to the inturned portion 46 of the U-shaped element 42 at its lower end and the upper end of this strip 60 is fastened by means of another rivet to the inturned portion of the lower end of each hook element 56. In this construction the hook elements 56 may be turned through 90° when the rest of the device has been collapsed, thereby enabling the hooks themselves to lie practically flat against the upper face of the table portion 10 accordingly providing an even still more compact telescoped relationship.

In Figure 5 a spring clamp 66 is shown as fastened to the upper face of the table 10 adjacent its forward edge, this being for the purpose of holding papers on the table and preventing their being lost or blown off. This is manipulated by means of the usual handle or the like 68 and is spring-held in paper-clasping position. It is fastened on the table top by means of screws 70.

It will be evident that herein is provided a collapsible car desk for use in automobiles or under similar circumstances and which will provide a very suitable and satisfactory writing structure for many purposes, not to mention the fact that it can also be used for serving lunches or in various other relationships.

It is readily positioned and adjusted to practically any make of automobile and if there is only one occupant in the front seat it can be kept in position at all times for immediate use and in most modern cars will still leave room for another occupant if desired.

When not in use it can easily be taken off, collapsed and put away, while at the same time requiring a minimum of space.

I am aware that many changes may be made and numerous details of construction varied throughout a wide range without departing from the principles of this invention and I, therefore, do not purpose limiting the patent granted hereon otherwise than as necessitated by the prior art.

I claim as my invention:

1. A car desk comprising a working surface, means for supporting the same on an automobile seat, said means including an adjustable foldable leg member for the front portion, hook elements for the rear portions, means for folding the device into a relatively small space when not in use, said means including a pivoted support for the forward leg member, a hinged bracket attachment for the rear hooks, said hinged bracket attachment including means for bracing the rear end of the platform against the front face of the back of the seat, the bracket attachment including two U-shaped elements, one fastened under the face of the working surface and the other pivotally attached to the first element, two links connecting the brackets, each link pivoted to one bracket and fitted into adjustable relationship with the other bracket, said adjustable relationship including a slot in each of the arms of the second bracket, winged nuts and bolts adapted to ride in the slots, and further means for folding the hook elements into closed juxtaposition with the working surface.

2. A car desk comprising a working surface, means for supporting the same on an automobile seat, said means including an adjustable leg member for the front portion, hook elements for the rear portion, means for folding the device into a relatively small space when not in use, said means including a pivoted support for the forward leg member, a hinged bracket attachment for the rear hooks, said hinged bracket attachment including means for bracing the rear end of the platform against the front face of the back of the seat, the bracket attachment including means for bracing the rear end of the platform against the front face of the back of the seat, the bracket attachment including two U-shaped elements, one fastened under the face of the working surface and the other pivotally attached to the first element, two links connecting the brackets, each link pivoted to one bracket and fitted into adjustable relationship with the other bracket, said adjustable relationship including a slot in each of the arms of the second bracket, winged nuts and bolts adapted to ride in the slots, and further means for folding the hook elements into close juxtaposition with the working surface, said means including an extension adjacent the junction of each hook element and the corresponding portion of its supporting bracket.

WILLIS H. HUBSCH.

REFERENCES CITED

The following references are of record in the file of this patent:

UNITED STATES PATENTS

| Number | Name | Date |
| --- | --- | --- |
| 1,383,324 | Martell | July 5, 1921 |
| 1,403,317 | Gross | June 10, 1922 |
| 1,451,655 | Gilley | Apr. 10, 1923 |
| 1,742,822 | Olson | Jan. 7, 1930 |
| 2,173,569 | Troendle | Sept. 19, 1939 |
| 2,188,897 | Hall | Feb. 6, 1940 |
| 2,399,792 | Copp | May 7, 1946 |